UNITED STATES PATENT OFFICE 2,477,924

METHOD OF PREPARING URANIUM TRIOXIDE

Sherman M. Fried, Chicago, Ill., and Norman R. Davidson, Sierra Madre, Calif., assignors to the United States of America as represented by the United States Atomic Energy Commission No Drawing. Application January 15, 1948, Serial No. 2,558

4 Claims. (Cl. 23—14.5)

This invention relates to the preparation of oxides of uranium in crystalline form, and more particularly relates to the preparation of higher oxides of uranium from lower oxides of uranium.

The crystalline oxides of uranium and especially the crystalline trioxide of uranium are compounds particularly well suited to processes for the production of uranium pentachloride. Since preparation of uranium trioxide by a process such as the thermal decomposition of hydrated uranyl peroxide usually produces uranium trioxide in an amorphous form, a process for the production of crystalline uranium trioxide is particularly advantageous.

It is thus an object of this invention to provide a method whereby an amorphous oxide of uranium can be converted to crystalline form.

It is a further object of this invention to provide a method whereby a lower oxide of uranium can be converted to a higher oxide.

A further object of this invention is to provide a method whereby a lower oxide of uranium in the amorphous phase can be converted to a higher oxide in the crystalline form.

Other objects and advantages will become apparent upon further examination of this specification.

In accordance with the process of this invention an amorphous oxide of uranium is converted to uranium oxide in crystalline form by subjecting the amorphous uranium oxide to superatmospheric pressures of oxygen at an elevated temperature. The amorphous oxide of uranium is heated at temperatures between 450–750° C. under oxygen pressures varying from 20–150 atmospheres. The crystalline product thus formed is characterized by its color as well as the crystal lattice constants and crystalline form.

In one embodiment of this invention amorphous uranium trioxide ($UO_3$) is converted to the crystalline form of the same compound by heating at temperatures between 450–750° C. in the presence of oxygen under a pressure varying from 20–150 atmospheres.

In a further embodiment of this invention a lower oxide of uranium, such as uranyl uranate ($U_3O_8$) in either amorphous or crystalline form is converted to the higher oxide ($UO_3$) in crystalline form by heating within the same temperature range and subjecting to oxygen under the same pressure conditions as previously set forth herein. It is apparent from the data listed in the table that the time required for conversion of uranyl uranate ($U_3O_8$) to the higher oxide ($UO_3$) varies from 12–112 hours depending upon the pressures and temperatures to which the system is subjected.

In a further embodiment of this invention the crystalline form of uranium oxide is prepared more rapidly by treating an amorphous uranium oxide with oxygen under superatmospheric pressures ranging between 60–150 atmospheres at a temperature from 700–750° C. for periods as short as 1½–2 hours. It is apparent from the data set forth hereafter that the temperatures and pressures necessary for conversion of the amorphous oxide and the lower oxide to the higher oxide in crystalline form vary directly with each other and inversely with the duration of treatment of the starting material. This is further illustrated by the reaction wherein uranyl uranate ($U_3O_8$) is converted to the hexagonal uranium trioxide ($UO_3$) in 100% yield by treatment of either the amorphous or crystalline uranyl uranate ($U_3O_8$) with oxygen under a pressure from 60–150 atmospheres at a temperature from 700–750° C. for periods as short as 1½–2 hours.

The temperature and pressure conditions used in several experiments, wherein amorphous oxides of uranium are converted to crystalline uranium trioxide, are set forth in the following table.

| Substance treated | Temp., °C. | Oxygen Pressure | Time | Phases Present in product (by X-ray Analysis) | Formula of product Calc'd from Oxygen Uptake | Formula of product Calc'd from Ignition to $U_3O_8$ |
|---|---|---|---|---|---|---|
| | | Atm. | Hrs. | | | |
| $UO_3{}^a$ | 450–500 | 28 | 12 | hexag | | |
| $U_3O_8$ | 500 | 28 | 36 | hexag.+phase II | | |
| $U_3O_8$ | 500 | 28 | 36 | ...do... | $UO_{2.97}$ | |
| $U_3O_8$ | 530–560 | 30 | 36 | ...do... | | $UO_{3.008}$ |
| $U_3O_8$ | 530–560 | 30 | 112 | phase II+phase III | $UO_{2.997}$ | $UO_{2.991}$ |
| $UO_3{}^b$ | 530–560 | 30 | 112 | hexag.+phase II | | |
| $U_3O_8$ | 700 | 150 | 2 | phase III | | |
| $U_3O_8$ | 750 | 70 | 1.5 | ...do.$^c$... | $UO_{2.993}$ | $UO_{3.01}$ | a The $UO_3$ was prepared by heating $UO_4.2H_2O$ to 400° C.
b $UO_3$ actually lost 0.254% in weight under these conditions, probably because of moisture or oxides of nitrogen present in the original compound. If this weight loss is assumed to be due to moisture, the calculated composition of the starting material was $UO_3.0.4H_2O$.
c The packing density of this material was measured as 3.88.

In the above table, the substance referred to as "phase II" is described as having a red color which is identified as a hydrated form of uranium trioxide and is less stable than that phase identified as phase III, which is a yellow crystalline material having the same lattice dimensions and hexagonal crystal structure as set forth herein for anhydrous uranium trioxide.

The apparatus for heating uranium oxides under superatmospheric pressures of oxygen consists of a heavy-walled glass tube (I. D. 4 mm., O. D. 12 mm.) to which a short length of 1 mm. capillary is sealed. The tube is attached to a vacuum apparatus and pure dry oxygen is condensed in the small capillary to a measured length which determines the pressure in the bomb when it is sealed off at the proper point. The pressures quoted in the various experiments were calculated from the measured length of liquid oxygen, assuming that the gas obeyed the perfect gas laws even at high pressures. As a safety precaution the glass bomb was placed inside a steel jacket fitted with plugs and the entire assembly was heated in a tube furnace.

Annealed Pyrex bombs could usually withstand pressures of 30 atmospheres at 500° C. For experiments at higher pressures and temperatures quartz bombs were used. A quartz bomb of 3 mm. I. D. and 10 mm. O. D. withstood 70 atmospheres oxygen pressure at 750° C., while a quartz capillary bomb 1 mm. I. D. and 10 mm. O. D. withstood a pressure of 150 atmospheres at 700° C.

The identification of the uranium trioxide produced by the process of this invention is based on the observed color and the X-ray diffraction pattern.

Uranium trioxide is hexagonal. The unit cell contains one molecule and has the lattice dimensions:

$$a_1 = 3.963 \pm .004 \text{ Å}.$$
$$a_3 = 4.160 \pm .008 \text{ Å}.$$

The calculated density is $\rho = 8.34$.

The space group is $C3m$ and the atomic positions are: 1 U in (0 0 0), 1 $O_I$ in (0 0 ½), 2 $O_{II}$ in $\pm$ (⅓ ⅔ u) with $u \approx 0.17$.

Each uranium atom is bonded to two oxygens of the first kind with $U-O_I = 2.08$ Å. and to six oxygens of the second kind with $U-O_{II} = 2.39$ Å.

The $O_I$-atoms should be regarded as uranyl oxygens, although there are no $(UO_2)^{+2}$ groups in the structure. Instead there are endless "uranyl chains" $-O_I-U-O_I-U-O_I-U-$ along the $a_3$ axis.

The uranyl uranate is orthorhombic with lattice dimensions as follows:

$$a_1 = 6.70$$
$$a_2 = 3.98$$
$$a_3 = 4.14$$

and two uranium atoms per cell at (0 0 0) (½ ½ 0). Since there are 5⅓ oxygens in this cell and weak lines were observed in long exposure patterns, we have concluded that the true unit cell of uranyl uranate is more accurately represented by a tripling of the $a_2$ axis. The true unit cell thus contains six uranium atoms and 16 oxygen atoms, and the lattice constants are as follows:

$$a_1 = 6.70$$
$$a_2 = 11.94$$
$$a_3 = 4.14$$

Referred to the larger cell, the positions of the uranium atoms become:

2U in (0 0 0) (½ ½ 0)
4U in ± (0 ⅓ 0), ± (½ ⅙ 0)

It has been observed that there is a strong similarity between the X-ray diffraction pattern obtained for the crystalline uranyl uranate, $U_3O_8$, and the crystalline trioxide.

The $U_3O_8$-structure is obtained from the $UO_3$-structure by means of slight changes. This is shown by referring the $UO_3$-structure to orthohexagonal axes and choosing the $a_2$ axis three times longer than required. The cell so obtained has dimensions:

$$a_1 = 6.86 \text{ Å}.$$
$$a_2 = 11.89 \text{ Å}.$$
$$a_3 = 4.16 \text{ Å}.$$

and the coordinates for the uranium atoms are exactly the same as given for $U_3O_8$ above. The oxygen positions in the two structures must be very similar also, the important difference being that there are no uranyl oxygens at (0 0 ½) (½ ½ ½) in the $U_3O_8$ structure so that the uranium atoms at (0 0 0) (½ ½ 0) are to be regarded as $U^{+4}$ atoms.

The examples following are illustrative for the process of this invention but are not to be construed as a limitation upon the appended claims.

EXAMPLE I

A sample of amorphous uranium trioxide ($UO_3$), prepared by the thermal (at 350 to 400° C.) decomposition of hydrated uranyl peroxide, ($UO_4.2H_2O$), was heated from 450 to 500° C. for 12 hours in 28 atmospheres of oxygen distilled from liquid oxygen. The amorphous uranium trioxide, which was originally colored bright orange became somewhat paler after this treatment, and X-ray examination of the product showed that the crystal structure was hexagonal and the lattice dimensions were the same as those listed previously for crystalline uranium trioxide ($UO_3$).

EXAMPLE II

A sample of uranyl uranate that had been ignited in air at 800° C. was treated with oxygen at a pressure of 28 atmospheres for 36 hours at 500° C. The color of the solid changed from black to deep red and X-ray analysis of the product indicated the presence of two phases: namely hexagonal uranium trioxide (phase I) which is isomorphous with the form obtained in Example I, and a new phase (phase II), which is colored red. The formula of the hexagonal product formed (phase I), as calculated from the weight difference measured with reference to the uptake of oxygen, is $UO_{2.97}$.

A second sample of uranyl uranate ($U_3O_8$) was heated for a total of 112 hours at a temperature between 530 and 560° C. with oxygen at a pressure of 30 atmospheres. The product consisted of two phases visible to the naked eye which could be separated mechanically. One phase was colored yellow and gave a pattern identical with that of uranium trioxide prepared by the ignition of the hydrated uranyl nitrate, $$(UO_2NO_3.6H_2O)$$

The formula of the product, as calculated from the oxygen uptake, is $UO_{2.997}$.

A 0.07267 g. sample of this product was ignited at 900° C. and thus converted to uranyl uranate (0.07136 g.). The formula of the product formed by the oxidation of uranyl uranate was calculated from the weight loss (0.00131 g. equivalent to 1.804%) on ignition, to be $UO_{2.2991}$.

A sample of uranyl uranate heated at 700° C. for two hours with oxygen at a pressure of 150 atmospheres produced uranium trioxide in the yellow crystalline phase (III).

EXAMPLE III

Uranyl uranate heated to 750° C. for one and one-half hours in the presence of 62–70 atmospheres of oxygen likewise formed the yellow crystalline phase, whose formula, as calculated from the oxygen uptake, was determined as $UO_{2.993}$ and, as calculated by the ignition to uranyl uranate, was $UO_{3.01}$. In all cases where uranyl uranate is ignited in oxygen at high pressures to form uranium trioxide the crystal structure of the product is that of anhydrous uranium trioxide rather than that of a hydrate.

The yellow crystalline phase of uranium trioxide (phase III) is stable for several hours in the presence of 1 atmosphere oxygen at 700° C. but at 800° C. is decomposed to uranyl uranate in contrast to the amorphous uranium trioxide which decomposes to $UO_{2.959}$ at 620° C. and to $UO_{2.82}$ at 625–630° C.

The X-ray diffraction patterns for $UO_{2.959}$ and $UO_{2.82}$ are both identical having the following lattice dimensions:

$$a_1 = 6.90 \pm 0.02 \text{ A.}$$
$$a_2 = 3.91 \pm 0.02 \text{ A.}$$
$$a_3 = 4.15 \pm 0.02 \text{ A.}$$

EXAMPLE IV

*Ignition of (hydrated) uranium trioxide*

A brick red colored sample of uranium trioxide having a bulk density of 4.5 was heated at 600° C. for one-half hour with oxygen at one atmosphere pressure. The sample decreased in weight by 0.92% and microscopic examination revealed the presence of two phases, one yellow and the other dark green. The phases could be partially separated by mechanical method and were respectively identified by X-ray analysis as uranium trioxide and uranyl uranate, the former being isomorphous with the hexagonal uranium trioxide. On heating the brick red sample in oxygen at 1 atmosphere pressure at 650–675° C. the weight loss was 0.06% and there was no change in appearance. Upon ignition in air at 850° C., the weight loss was 1.67% and the product was uranyl uranate. The sample consisted of 87% of the anhydrous yellow uranium trioxide after treatment at 650–675° C.

The foregoing descriptions comprise the preferred embodiments of this invention. However, many alternations and changes may be made therein without departing from the spirit and scope of this invention as set forth in the appended claims, which are intended to cover as broadly as possible in view of the prior art, all features of novelty taken singly and/or in combination.

What is claimed is:

1. A process for the preparation of uranium trioxide in crystalline form, comprising heating an amorphous oxide of uranium at a temperature between 450–750° C. in the presence of between 20–150 atmospheres pressure of oxygen.

2. A process for the preparation of a crystalline uranium oxide, comprising heating uranyl uranate at a temperature between 450–750° C. in contact with oxygen, said oxygen being present at pressures between 20–150 atmospheres.

3. A process for the preparation of a crystalline uranium oxide, comprising heating uranyl uranate at a temperature between 700–750° C. in contact with oxygen, said oxygen being under a pressure between 60–150 atmospheres.

4. A process for the preparation of crystalline uranium trioxide, comprising heating amorphous uranium trioxide at a temperature between 450–750° C. in contact with between 20–150 atmospheres pressure of oxygen.

SHERMAN M. FRIED.
NORMAN R. DAVIDSON.

REFERENCES CITED

The following references are of record in the file of this patent:

Hopkins, Chapters in the Chemistry of the Less Familiar Elements, vol. II, chap. 18, Uranium, pages 11 and 12. Pub. in 1940 by Stipes Publishing Co., Chicago, Illinois.